United States Patent [19]

Kwon

[11] Patent Number: 5,737,721
[45] Date of Patent: Apr. 7, 1998

[54] PREDICTIVE TECHNIQUE FOR SIGNAL TO MASK RATIO CALCULATIONS

[75] Inventor: Soon-Keon Kwon, Seoul, Rep. of Korea

[73] Assignee: Daewoo Electronics Co., Ltd., Seoul, Rep. of Korea

[21] Appl. No.: 554,622

[22] Filed: Nov. 6, 1995

[30] Foreign Application Priority Data

Nov. 9, 1994 [KR] Rep. of Korea .............. 94-29219

[51] Int. Cl.$^6$ .............................. G10L 9/14; G10L 7/00
[52] U.S. Cl. .............................. 704/229; 704/226; 704/206
[58] Field of Search .............................. 395/2.09, 2.1–2.15, 395/2.29–2.32, 2.38, 2.39; 704/200, 201–206, 220–223, 229, 230

[56] References Cited

U.S. PATENT DOCUMENTS

| | | | |
|---|---|---|---|
| 5,285,498 | 2/1994 | Johnston | 395/2.12 |
| 5,469,474 | 11/1995 | Kitabatake | 395/2.38 |
| 5,481,614 | 1/1996 | Johnston | 395/2.1 |
| 5,508,949 | 4/1996 | Konstantinides | 395/2.12 |
| 5,537,510 | 7/1996 | Kim | 395/2.38 |
| 5,588,024 | 12/1996 | Takano | 395/2.38 |
| 5,592,584 | 1/1997 | Ferreira et al. | 395/2.12 |
| 5,613,035 | 3/1997 | Kim | 395/2.38 |
| 5,619,197 | 4/1997 | Nakamura | 341/50 |
| 5,625,743 | 4/1997 | Fiocca | 395/2.14 |
| 5,627,937 | 5/1997 | Kim | 395/2.38 |
| 5,627,938 | 5/1997 | Johnston | 395/2.38 |
| 5,633,980 | 5/1997 | Ozawa | 395/2.31 |
| 5,649,053 | 7/1997 | Kim | 395/2.38 |

*Primary Examiner*—David D. Knepper
*Attorney, Agent, or Firm*—Anderson, Kill & Olick, P.C.

[57] ABSTRACT

Using frequency and time masking effects to encode an audio signal. The frequency band of the digital audio signal is divided into a number of subbands. First signal-to-mask ratios for the respective subbands are estimated in response to digital signal samples in each subband of the ith frame included in the audio signal. The first signal-to-mask ratio for the ith frame are stored for a predetermined time period and delayed signal-to-mask ratios for the (i-1)st frame are prestored and synchronized with the first signal-to-mask ratios. Second signal-to-mask ratios are based on the first signal-to-mask ratios and the delayed signal-to-mask ratios. Adaptive bit allocations for each of the subbands are based on the second signal-to-mask ratios Digital signal samples are quantized in each subband in response to the generated bit allocation information for each of the subbands. Finally, the quantized digital signal samples are formatted using the generated bit allocation information.

3 Claims, 1 Drawing Sheet

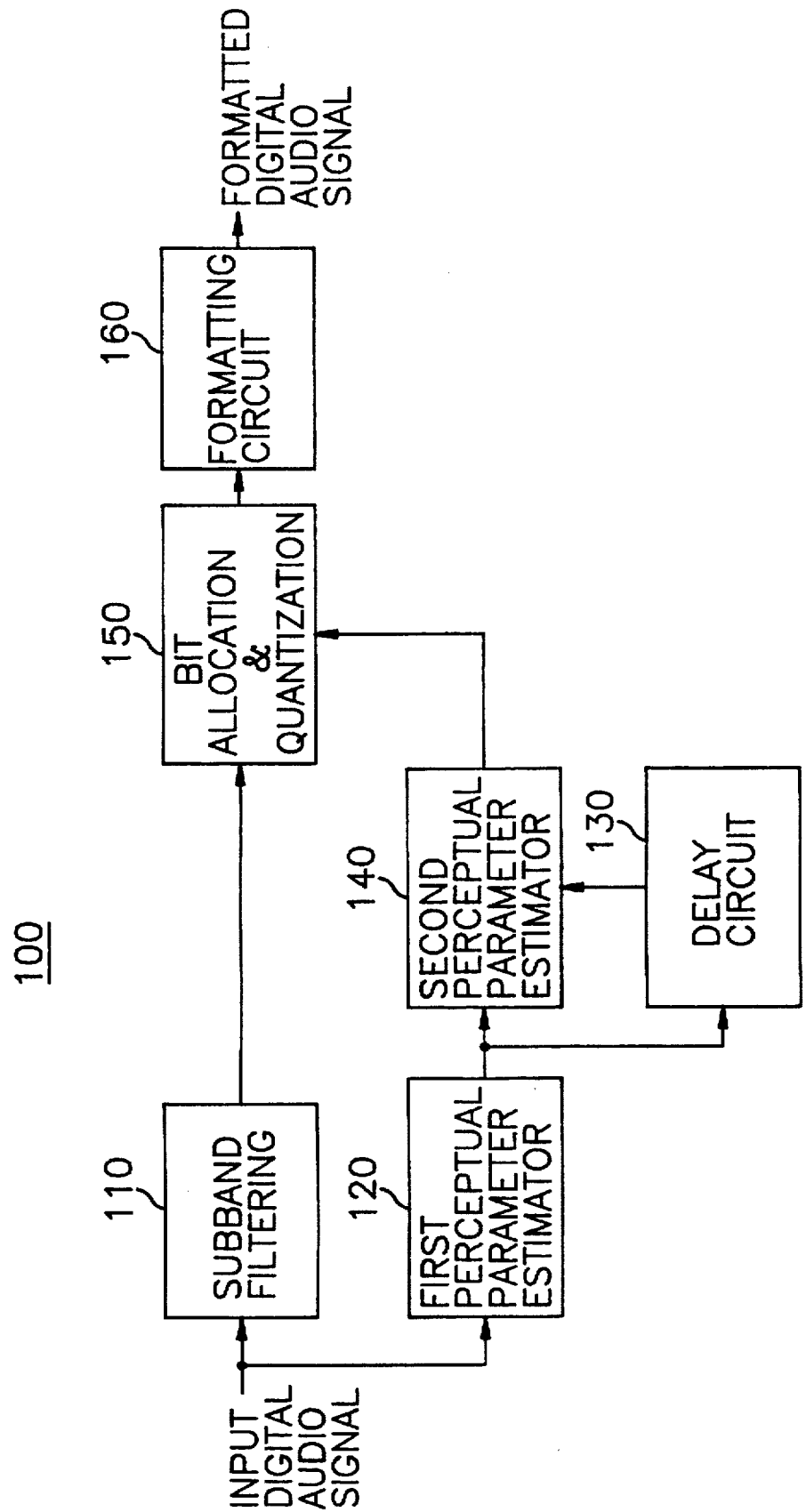

PREDICTIVE TECHNIQUE FOR SIGNAL TO MASK RATIO CALCULATIONS

FIELD OF THE INVENTION

The present invention relates to a method for encoding a digital audio signal; and, more particularly, to an improved method for encoding a digital audio signal comprising a plurality of frames based on a human auditory perception with respect to frequency and time masking effects.

DESCRIPTION OF THE PRIOR ART

Transmission of digitized audio signals makes it possible to deliver high quality audio signals comparable to those of a compact disc and/or a digital audio tape. When an audio signal is expressed in a digital form, a substantial amount of data need be transmitted especially in the case of a high definition television system. Since, however, the available frequency bandwidth assigned to such digital audio signals is limited, in order to transmit the substantial amounts of digital data, e.g., 768 Kbits per second for 16 bit PCM (Pulse Code Modulation) audio signal with 48 KHz sampling frequency, through the limited audio bandwidth of, e.g., about 128 KHz, it becomes inevitable to compress the digital audio data.

Among the various audio compression devices or techniques, the so-called MPEG (Moving Pictures Expert Group)Audio Algorithm, which employs a psychoacoustic algorithm, has been suggested for HDTV applications.

In an audio encoding system which adopts the above MPEG audio technique four primary parts, i.e., subband filtering, psychoacoustic modeling, quantizing and coding, and frame formatting, are employed to compress the digital audio data. The subband filtering is a process of mapping, from the time domain to the frequency domain, an input PCM digital audio signal. A filterbank with B (e.g., 32) subbands may be used. In each subband 12 or 36 samples are grouped for the processing thereof; and the grouped samples from said B subbands, i.e., N×12 or 36 constitute a "frame", which is a processing unit for the encoding, transmission and decoding of audio signals. The psychoacoustic modeling creates a set of data, e.g., SMR (signal-to-mask ratio) data, for each subband or group of subbands through the use of a frequency masking effect, to thereby control the quantizing and coding thereof, wherein the frequency masking effect represents an increase in the audible limit or threshold of audibility for a sound caused by the presence of another (i.e., masking) contemporary sound in the frequency domain. Available bits are, then, adaptively allocated to each subband of a frame with reference to the SMR in the process of quantizing and coding the subband samples. A frame formatter formats the frame data together with other required side information in a suitable fashion for transmission.

Even though this technique may enhance a coding efficiency through the use of the frequency masking effect, it is incapable of reflecting a time masking effect representative of a phenomenon wherein the audible limit or threshold of audibility for a sound is raised due to the presence of another temporally adjacent sound in the time domain, thus unable to provide an audio signal encoding which fully improves the coding efficiency.

SUMMARY OF THE INVENTION

It is, therefore, a primary object of the present invention to provide an improved method for encoding a digital audio signal comprising a plurality of frames based on frequency and time masking effects, thereby enhancing the coding efficiency thereof.

In accordance with the present invention, there is provided a method for adaptively encoding a digitally sampled audio signal including a plurality of frames, which comprises the steps of: (a) dividing the frequency band of the digital audio signal into a number of B subbands, wherein B is an integer greater than 1 and the bandwidths of the subbands substantially correspond to bandwidths which are critical to the human auditory system; (b) estimating first signal-to-mask ratio for the respective subbands in response to the digital signal samples in each subband for an ith frame included in the digital audio signal, i being a frame index; (c) storing the first signal-to-mask ratios for the ith frame for a predetermined time period and generating delayed signal-to-mask ratios for the (i−1)st frame prestored therein synchronized with the first signal-to-mask ratios; (d) providing second signal-to-mask ratios based on the first signal-to-mask ratios and the delayed signal-to-mask ratios; (e) adaptively determining bits for each of the subbands based on the second signal-to-mask ratios, and for generating bit allocation information corresponding to the determined bits for each of the subbands; (f) quantizing the digital signal samples in each subband in response to the generated bit allocation information for each of the subbands; and (g) formatting the quantized digital signal samples together with the generated bit allocation information.

BRIEF DESCRIPTION OF THE DRAWING

The above and other objects and features of the present invention will become apparent from the following description given with reference to the accompanying drawing, which is a block diagram schematically illustrating an apparatus for encoding an input digital audio signal in accordance with the present invention.

DETAILED DESCRIPTION OF THE PREFERRED EMBODIMENTS

Referring to the drawing, there is shown a block diagram schematically illustrating an apparatus for encoding a digital audio signal in accordance with the present invention.

The digital audio encoding apparatus 100 comprises a subband filtering block 110, first and second perceptual parameter estimators 120 and 140, a delay circuit 130, a bit allocation and quantization block 150, and a formatting circuit 160.

A digitally sampled input audio signal X(n) of an ith frame, which includes N samples, i.e., n=0, 1, . . . , N−1, is applied to the first perceptual parameter estimator 120 and the subband filtering block 110 which is adapted to perform a subband filtering operation of the input digital audio signal, wherein N is a positive integer. A "frame" used herein denotes a part of the digital audio signal which corresponds to a fixed number of audio samples and is a processing unit for the encoding and decoding of the digital audio signal.

The subband filtering block 110 receives the input digital audio signal of the ith frame and divides the frequency band of the input digital audio signal into a number of B, e.g., 32, subbands by employing a subband filtering technique well known in the art, e.g., the method disclosed in the so-called MPEG Audio Algorithm described in *ISO/IEC JTC1/SC2/ WG 11, "Part 3, Audio Proposal"*, CD-11172-3(1991), wherein the bandwidths of the subbands substantially correspond to bandwidths which are critical to the human auditory system. The digital signal samples in each of the subbands are then provided from the subband filtering block 110 to the bit allocation and quantization block 150.

On the other hand, the first perceptual parameter estimator 120 receives the digitally sampled input audio signal of the ith frame and estimates first signal-to-mask ratios for the ith frame by using a psychoacoustic model, e.g., the one discussed in the MPEG Audio Algorithm supra. The first signal-to-mask ratio for each subband of the ith frame, which is well known in the art, may be derived as follows:

$$SMR_1(j, i) = P(j, i) - M(j, i) \quad \text{Eq. (1)}$$

wherein i is a frame index; j, a subband index with j=0, 1, ..., B−1, B being the total number of subbands in a frame; $SMR_1(j, i)$, a first signal-to-mask ratio in subband j of the ith frame; P(j, i), a sound pressure level in subband j of the ith frame estimated from a FFT (Fast Fourier Transform) technique; M(j, i), a frequency masking threshold in subband j of the ith frame; and said $SMR_1(j, i)$, P(j, i) and M(j, i) are all in a dB (decibel) unit.

The frequency masking threshold represents an audible limit which is a sum of the intrinsic audible limit or threshold of a sound and an increment caused by the presence of other tonal and non-tonal components of the audio signal. The first signal-to-mask ratios for the ith frame are then fed to the delay circuit 130 and the second perceptual parameter estimator 140.

In the delay circuit 130, the first signal-to-mask ratios for the ith frame are stored in a memory (not shown) thereof and delayed for a predetermined time period; and delayed signal-to-mask ratios for the (i−1)st frame prestored in the memory are provided to the second perceptual parameter estimator 140 synchronized with the first signal-to-mask ratios applied thereto. The delay circuit 130 can be easily implemented by employing general electronic circuitries well known in the art. The predetermined time period, i.e., delay time of the delay circuit 130, is determined by taking into account the time masking effect representative of a phenomenon wherein the audible limit or threshold of audibility for a sound is raised due to the presence of another temporally adjacent sound in the time domain. In a preferred embodiment of the present invention, the predetermined delay time is equivalent to one frame processing time of the digital audio signal. The delayed signal-to-mask ratios for the (i−1)st frame and the first signal-to-mask ratios for the ith frame are simultaneously fed to the second perceptual parameter estimator 140 which calculates second signal-to-mask ratios for the ith frame as follows:

$$SMR_2(j, i) = MIN[k \times DSMR_1(j, i-1), SMR_1(j, i)] \quad \text{Eq. (2)}$$

wherein $SMR_1(j, i)$, j and i have the same meanings as previously defined; $SMR_2(j, i)$, a second signal-to-mask ratio in subband j of the ith frame; $DSMR_1(j, i-1)$, a delayed signal-to-mask ratio in subband j of the (i−1)st frame; and k, a constant larger than 0 and smaller than 1.

In the preferred embodiment of the invention, the constant value k can be determined based on the time masking effect of the human auditory perception, and is preferably set to 0.5, said value 0.5 being an appropriate value to reflect the time masking effect.

The second signal-to-mask ratio for each subband of the ith frame from the second perceptual parameter estimator 140 is then provided to the bit allocation and quantization block 150. In the bit allocation and quantization block 150, bits for each of the subbands are adaptively determined based on the second signal-to-mask ratio for each of the subbands of the ith frame and bit allocation information corresponding to the determined bits for each of the subbands is generated. Thereafter, the digital signal samples in each subband are quantized in response to the generated bit allocation information for each of the subbands and the quantized digital signal samples for each subband of the ith frame and the bit allocation information are simultaneously provided to the formatting circuit 160. At the formatting circuit 160, the quantized digital signal samples and the bit allocation information from the bit allocation and quantization block 150 are formatted and transmitted to a transmitter (not shown) for the transmission thereof. The principles and functions of the bit allocation and quantization block 150 and the formatting circuit 160 are basically identical to those which can be found in the MPEG Audio Algorithm.

While the present invention has been shown and described with reference to the particular embodiments, it will be apparent to those skilled in the art that many changes and modifications may be made without departing from the spirit and scope of the invention as defined in the appended claims.

What is claimed is:

1. A method for adaptively encoding a digitally sampled audio signal including a plurality of frames, which comprises the steps of:

(a) dividing the frequency band of the digital audio signal into a number of P subbands, wherein said P is an integer larger than 1 and the bandwidths of said subbands substantially correspond to bandwidths which are critical to a human auditory system;

(b) estimating first signal-to-mask ratios for the respective subbands in response to the digital signal samples in each subband included in the ith frame of the digital audio signal, said i being a frame index;

(c) storing the first signal-to-mask ratios for the ith frame for a predetermined time period and generating delayed signal-to-mask ratios for the (i−1)st frame prestored therein synchronized with the first signal-to-mask ratios;

(d) providing second signal-to-mask ratios based on the first signal-to-mask ratios and the delayed signal-to-mask ratios;

(e) adaptively determining bits for each of the subbands based on the second signal-to-mask ratios, and for generating bit allocation information corresponding to the determined bits for each of the subbands;

(f) quantizing the digital signal samples in each subband in response to the generated bit allocation information for each of the subbands; and (g) formatting the quantized digital signal samples together with the generated bit allocation information.

2. The method as recited in claim 1, wherein the second signal-to-mask ratio in subband j of the ith frame, $SMR_2(j, i)$, is determined as:

$$SMR_2(j, i) = MIN[k \times DSMR_1(j, i-1), SMR_1(j, i)]$$

wherein j is a subband index j=0, 1, ..., P−1, P being the total number of subbands in a frame; i, a frame index; $DSMR_1(j, i-1)$, a delayed signal-to-mask ratio in subband j of the (i−1)st frame; $SMR_1(j, i)$, a signal-to-mask ratio in subband j of the ith frame; and k, a constant larger than 0 and smaller than 1.

3. The method as recited in claim 2, wherein the constant k is 0.5.

* * * * *